United States Patent [19]

Abbott et al.

[11] Patent Number: 4,632,836
[45] Date of Patent: Dec. 30, 1986

[54] PIZZA PREPARATION AND DELIVERY SYSTEM

[75] Inventors: Maxwell T. Abbott, Rose Hill; Gary S. Streepy; John R. Paulus, both of Wichita; Ricardo Barrera, Rose Hill; David E. Brewer, Wichita, all of Kans.

[73] Assignee: Pizza Hut, Inc., Wichita, Kans.

[21] Appl. No.: 599,497

[22] Filed: Apr. 12, 1984

[51] Int. Cl.$^4$ .............................. A23L 1/10; B60P 3/00
[52] U.S. Cl. ...................................... 426/302; 296/22; 296/24 R; 426/289; 426/523
[58] Field of Search ...................... 296/22, 24 R, 24 A, 296/156, 164; 126/24, 268, 276; 108/24, 28, 25, 27, 65, 90; 297/349; 312/282; 248/503, 507, 508, 636, 638; 455/345; 211/194, 59.4; 206/542–545, 0.81; 220/411, 412; 232/43.1, 43.4; D7/70, 71

[56] References Cited

U.S. PATENT DOCUMENTS

| 1,263,804 | 4/1918 | Rice | 126/276 |
|---|---|---|---|
| 1,263,805 | 4/1918 | Rice | 126/276 |
| 1,285,304 | 11/1918 | Merrill | 126/276 |
| 1,550,638 | 8/1925 | Taylor | 126/276 |
| 1,809,418 | 6/1931 | McCarthy | 108/24 |
| 2,057,197 | 10/1936 | Liptay | 296/22 |
| 2,461,197 | 2/1949 | Chambers | 296/22 |
| 2,624,451 | 1/1953 | Ewing | 220/412 |
| 2,658,667 | 10/1953 | Mirkin | 232/43.4 |
| 2,743,955 | 5/1956 | Willson | 296/156 |
| 2,982,578 | 5/1961 | Lowe | 296/22 |
| 3,191,400 | 6/1965 | Swenson | 296/22 |
| 3,198,189 | 8/1965 | Oatley | 126/24 |
| 3,349,941 | 10/1967 | Wanderer | 220/411 |
| 3,411,658 | 11/1968 | Swanson | 220/412 |
| 3,888,539 | 6/1975 | Niessner | 296/156 |
| 3,991,739 | 11/1976 | Hoffman, Jr. | 126/268 |
| 3,999,490 | 12/1976 | Rocker et al. | 108/27 |
| 4,027,249 | 5/1977 | Calman | 455/345 |
| 4,108,140 | 8/1978 | Wolze | 126/24 |
| 4,118,081 | 10/1978 | Barrientos | 312/8 |
| 4,270,319 | 6/1981 | Spasojevic | 296/24 A |
| 4,363,955 | 12/1982 | Gauthier et al. | 99/443 C |
| 4,391,435 | 7/1983 | Pham | 248/636 |
| 4,436,353 | 3/1984 | Tucker | 312/282 |

FOREIGN PATENT DOCUMENTS

| 0038250 | 3/1981 | European Pat. Off. | |
| 2644070 | 4/1978 | Fed. Rep. of Germany | 296/22 |
| 1182691 | 6/1959 | France | 296/22 |
| 605206 | 9/1978 | Switzerland | 296/22 |

Primary Examiner—Robert B. Reeves
Assistant Examiner—Dennis H. Pedder
Attorney, Agent, or Firm—Willian Brinks Olds Hofer Gilson & Lione Ltd.

[57] ABSTRACT

A pizza preparation and delivery system is disclosed including a vehicle having a driver's station and a kitchen area. The kitchen area includes a pie case, a pizza preparation station, an oven, and a chair for supporting a cook while in transit. In the preferred embodiment, the prearation station is defined by an upper surface of the pie case. The kitchen area also includes a hinged pizza cutting table, an ice bin and beverage dispensing unit. The beverage dispensing unit is connected by tubing to a beverage supply holder disposed adjacent to the driver's station. The beverage supply holder conceals a cash box. As a result of an order received by mobile radio, pizza is prepared in the kitchen area while the vehicle is en route to delivery destinations.

6 Claims, 31 Drawing Figures

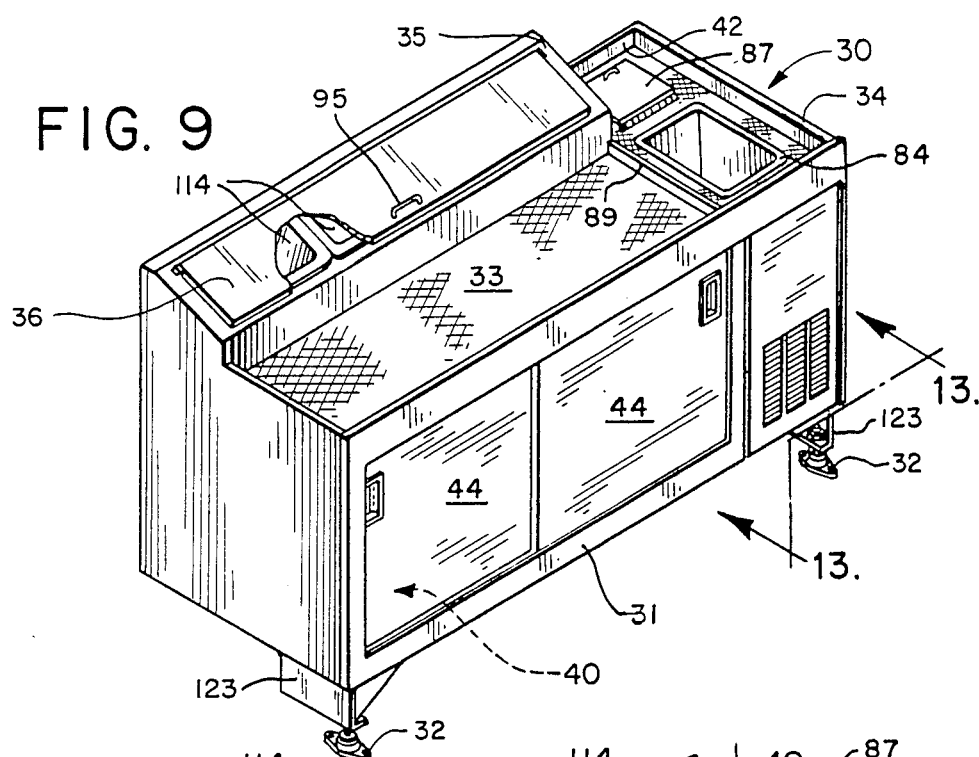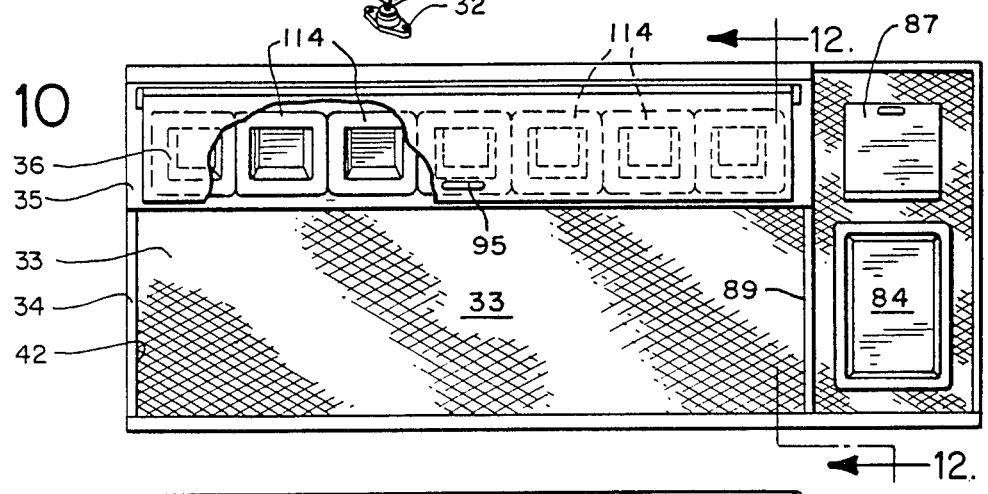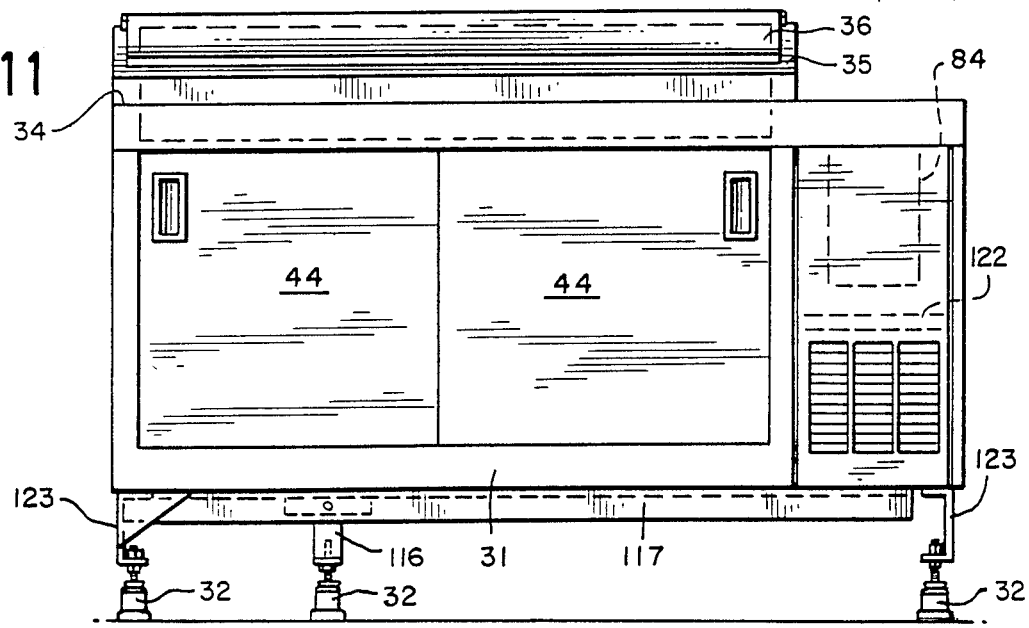

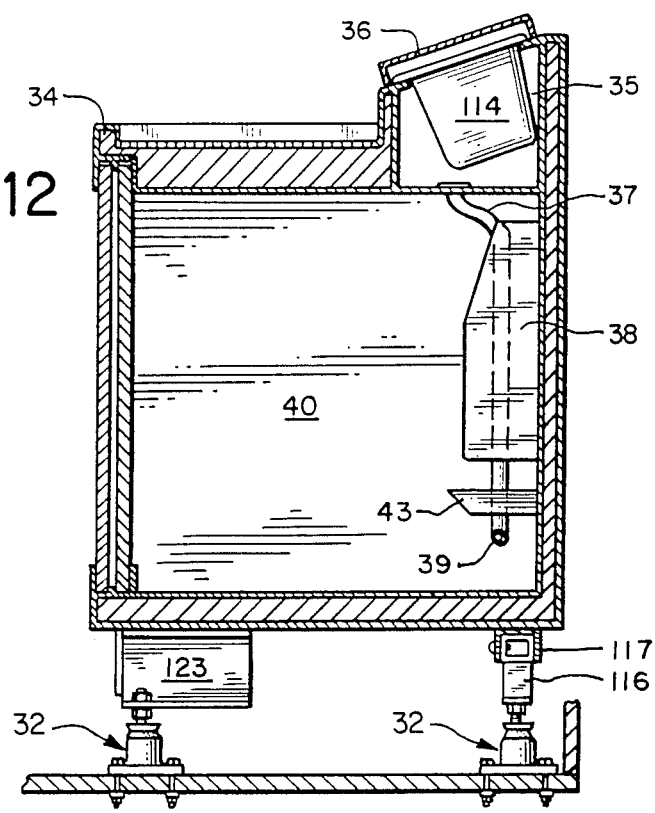
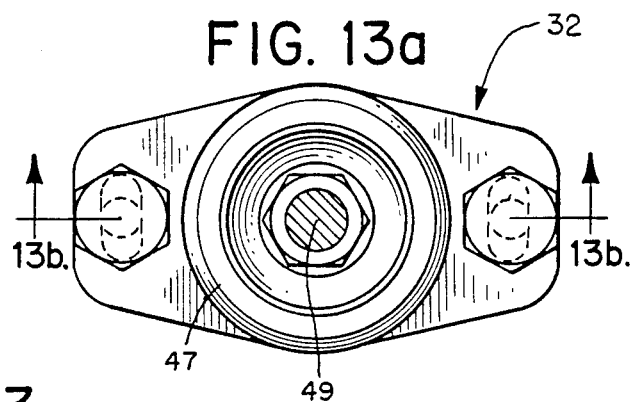
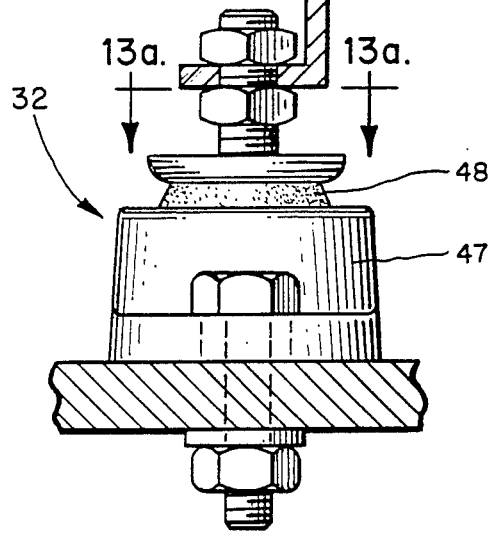
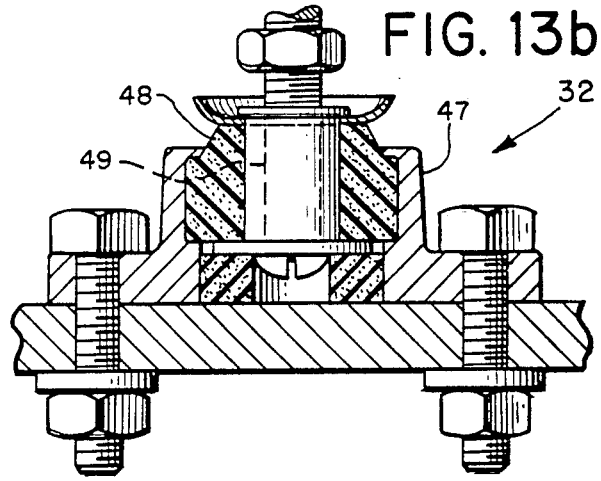

PIZZA PREPARATION AND DELIVERY SYSTEM

BACKGROUND OF THE INVENTION

This invention relates to a pizza preparation and delivery system.

In the past, pizza enthusiasts have generally found it necessary to leave their homes or places of work and travel to a pizza restaurant if they wanted a high quality fresh baked pizza. Although other methods of obtaining a pizza, such as purchasing a frozen pizza, cooking a fresh pizza from scratch or ordering a pizza for delivery, have been available for some time, these alternatives to visiting a restaurant are not without drawbacks. For example, frozen pizzas tend not to have the same high quality flavor and consistency as fresh pizzas, and of course, it is often inconvenient to bake a pizza from scratch. Further, ordering a pizza for delivery often results in disappointment for the pizza enthusiast. The delivered pizza is often lukewarm and soggy, and it may have lost flavor en route to the consumer.

Although the pizza industry has attempted to provide convenient delivery service to consumers, the problems attendant to traditional delivery systems may have limited the market. It has been difficult or impossible to guarantee the quality of delivered pizzas because of the lack of control over the pizzas once they leave the restaurant. This problem poses a risk to the good will of the restaurant. Yet another problem relates to security on delivery routes. The driver may be at risk if he carries large amounts of cash on his person. Yet if he leaves large amounts of cash in the truck, the cash could be stolen.

Thus, there presently exists a need for a pizza preparation and delivery system that can provide pizza enthusiasts with hot, high quality pizzas while assuring pizza delivery establishments continued good will resulting from customer satisfaction as well as cash security for the proceeds from the delivery business.

SUMMARY OF THE INVENTION

The present invention is directed to a pizza preparation and delivery system for delivering restaurant quality pizzas to the consumer.

The apparatus for the invention includes a vehicle for delivering fresh pizza. The pizza is prepared and cooked in the vehicle en route to delivery destinations. The vehicle generally comprises a driver's station and a kitchen area, and includes communication means for receiving pizza delivery orders. The kitchen area includes a pizza preparation station for preparing pizza; a refrigerated pie case for storing uncooked, proofed pizza dough and pizza topping ingredients; a pizza oven for cooking pizza; and means for supporting a cook against involuntary lateral movement when the vehicle is in transit. The cook supporting means is disposed such that the cook has access to the pizza oven, the pie case and the pizza preparation station while being supported in the event of vehicle acceleration.

According to a presently preferred embodiment, the cook supporting means comprises a cook's chair positioned centrally in the kitchen area at a working distance from the pie case, the pizza preparation station and the oven, such that a person seated therein can prepare and cook a pizza while the vehicle is in transit.

The present invention also includes a preferred kitchen layout that can advantageously be used in combination with the pizza preparation and delivery vehicle described. According to the preferred layout of this invention, the kitchen area includes a centrally disposed rotatable cook's chair, a pie case, a preparation table, a condiment tray, an oven and a cutting table. Of course, in other embodiments the cook's chair can be interchanged with other means for supporting a cook against involuntary lateral vehicle movement. For example, a simple support rail could be used for this purpose. In the preferred embodiment, the pie case is disposed adjacent to a first side wall of the vehicle and within working distance from the cook's chair. Preferably, the preparation table is defined by an upper surface of the pie case and the condiment tray is disposed adjacent to a rear edge of the preparation table. The preparation table and condiment tray are disposed within working distance from the cook's chair. The oven is preferably disposed near a back wall of the vehicle and the cutting table is disposed adjacent to a second side wall of the vehicle. Both the oven and cutting table are also within working distance from the cook's chair, such that the cook can rotate in the cook's chair and work, in sequence, at the preparation table, the oven and the cutting table. The cutting table is preferably hinged to provide a passageway to an exit door from the kitchen area to the outside.

Other aspects of this invention are directed to preferred features of the various components of the kitchen layout. These features may be used either separately or in combination to improve the efficiency of the pizza preparation and delivery system. Accordingly, the pie case used in the pizza preparation and delivery system can be equipped with vibration isolators to minimize the effect of truck vibrations on the dough contained in the pie case. The pie case can also be equipped with nestable storage retainers to minimize the risk of the pans sliding about therein. An upper surface of the pie case can be used as a preparation table, and can be provided with a grid or mesh surface adapted to engage with cleats integral with or attached to the pizza pans such that sliding upon the preparation table is prevented. A condiment tray can be provided as an integral part of the pie case and preparation table such that access to the ingredients necessary for pizza preparation is facilitated.

According to yet another aspect of the invention, the pizza preparation and delivery system of the present invention can also include means for dispensing cold carbonated beverages. Advantageously, a beverage dispensing tower will be provided in the kitchen area and this will be connected to a beverage supply holder situated next to the driver's seat. This beverage supply holder preferably includes a cash box integrally formed therewith.

According to the method of this invention, a pizza delivery vehicle is provided, equipped with means for receiving pizza delivery orders and for preparing and cooking a pizza while in transit. The vehicle includes a refrigerated pie case for storing uncooked, proofed dough, a preparation station equipped with a variety of topping ingredients, and an oven. While the delivery vehicle is in transit, the pizza dough is removed from the pie case. Topping ingredients are then selected from the preparation station and the dough and toppings are assembled to form an uncooked pizza. The pizza is then placed in the oven which is set at a selected temperature, and after a selected cooking time the pizza is removed therefrom.

According to a preferred method of the invention, the dough is stored in pizza pans which are in turn stored in the pie case. Pan restraining rings having a plurality of cleats may be provided, and the stored pizza pans may be placed in the rings after their removal from the pie case. The cleats will maintain the position of the pizza pans on a grid or mesh surface of the preparation table and on the conveyor belt of the oven.

In summary, the present invention of a pizza preparation and delivery system includes aspects directed towards a new method and apparatus for making pizza in a moving vehicle en route to delivery destinations. Further, the present invention includes refinements to the individual elements of the preparation and delivery equipment.

The present invention, together with attendant objects and advantages, will be best understood with reference to the detailed description and accompanying drawings.

BRIEF DESCRIPTION OF THE DRAWINGS

FIG. 9 is a perspective view of the pie case of the vehicle of FIG. 1.

FIG. 10 is a plan view of the pie case of FIG. 9.

FIG. 11 is a front elevation view of the pie case of FIG. 9.

FIG. 12 is a transverse cross sectional view taken along line 12—12 of FIG. 10.

FIG. 13 is a fragmentary view taken along line 13—13 of FIG. 9.

FIG. 13a is a cross-sectional view taken along line 13a—13a of FIG. 13.

FIG. 13b is a cross-sectional view taken along line 13b—13b of FIG. 13a.

DETAILED DESCRIPTION OF THE PRESENTLY PREFERRED EMBODIMENTS

Figure 1:
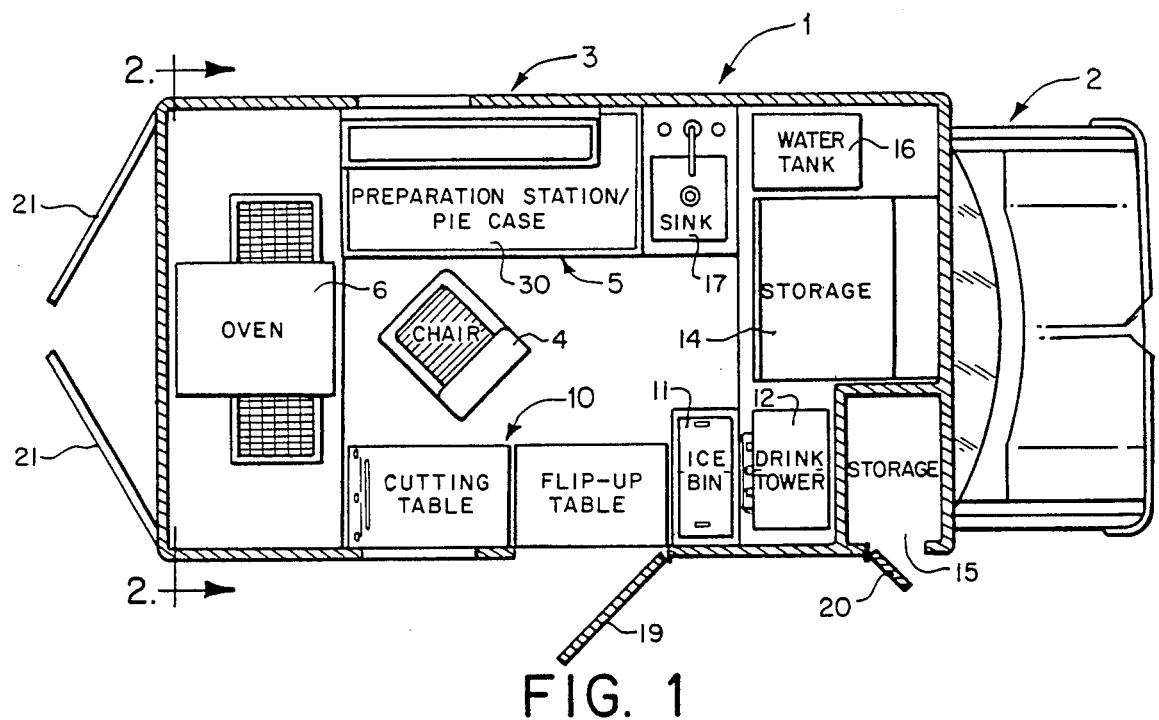
FIG. 1 is a plan view of a preferred embodiment of the kitchen area of the pizza preparation and delivery vehicle of the present invention.
Figure 2:
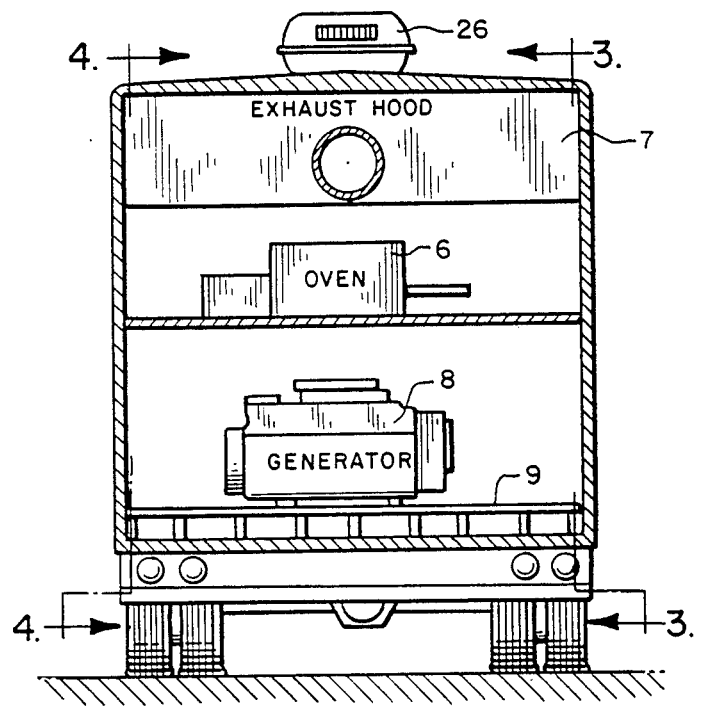
FIG. 2 is a rear view taken along line 2—2 of FIG. 1.
Figure 3:
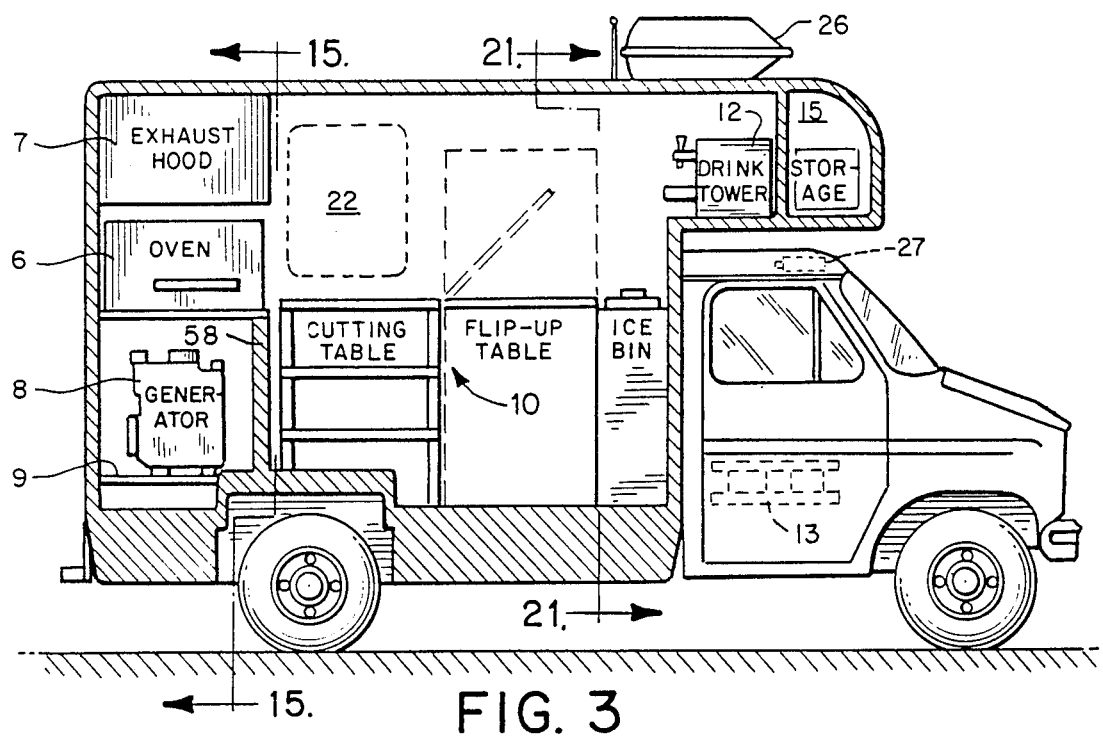
FIG. 3 is a right side view taken along line 3—3 of FIG. 2.
Figure 4:
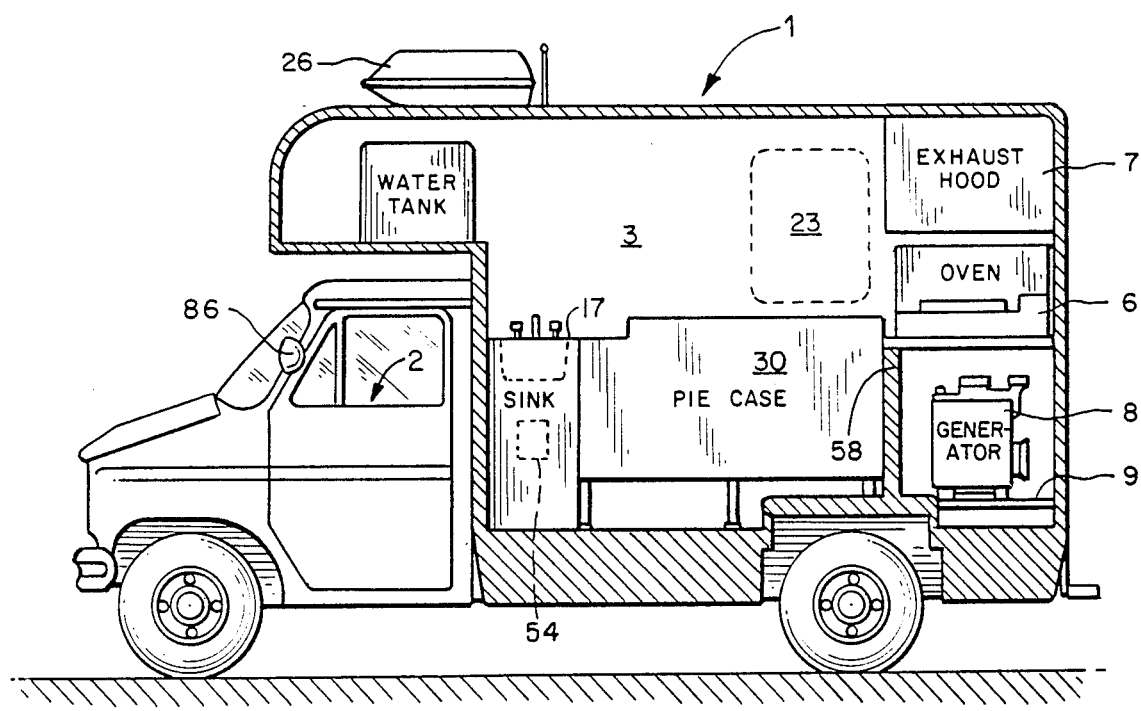
FIG. 4 is a left side view taken along line 4—4 of FIG. 2.
Figure 5:
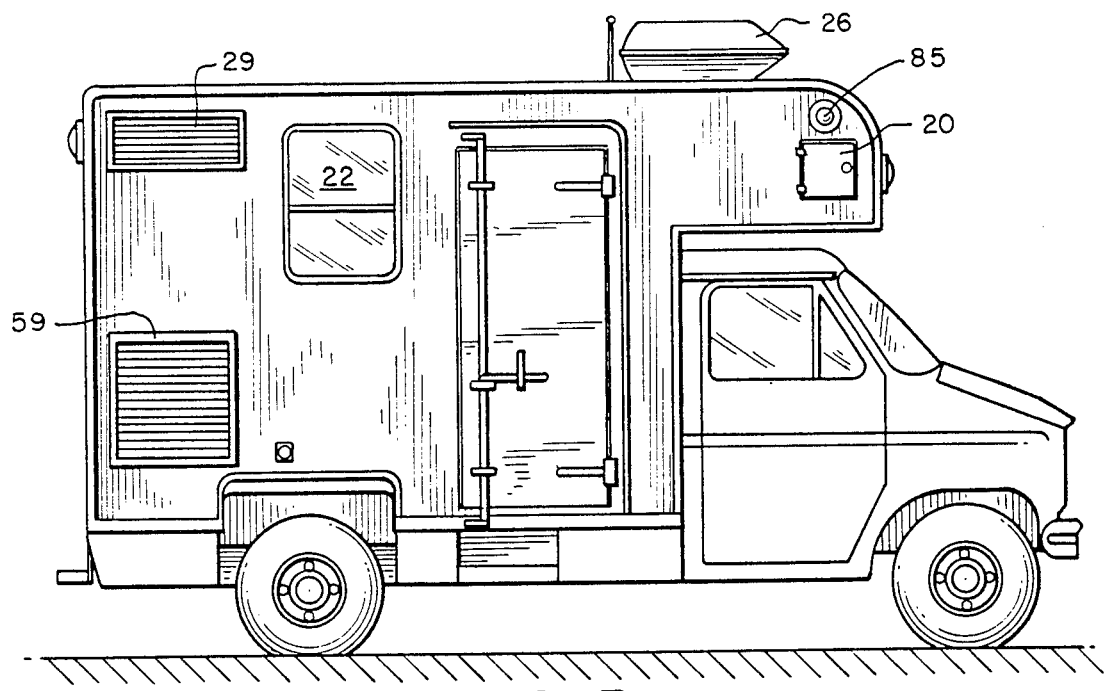
FIG. 5 is a left side view of the pizza preparation and delivery vehicle of FIG. 1.
Figure 6:
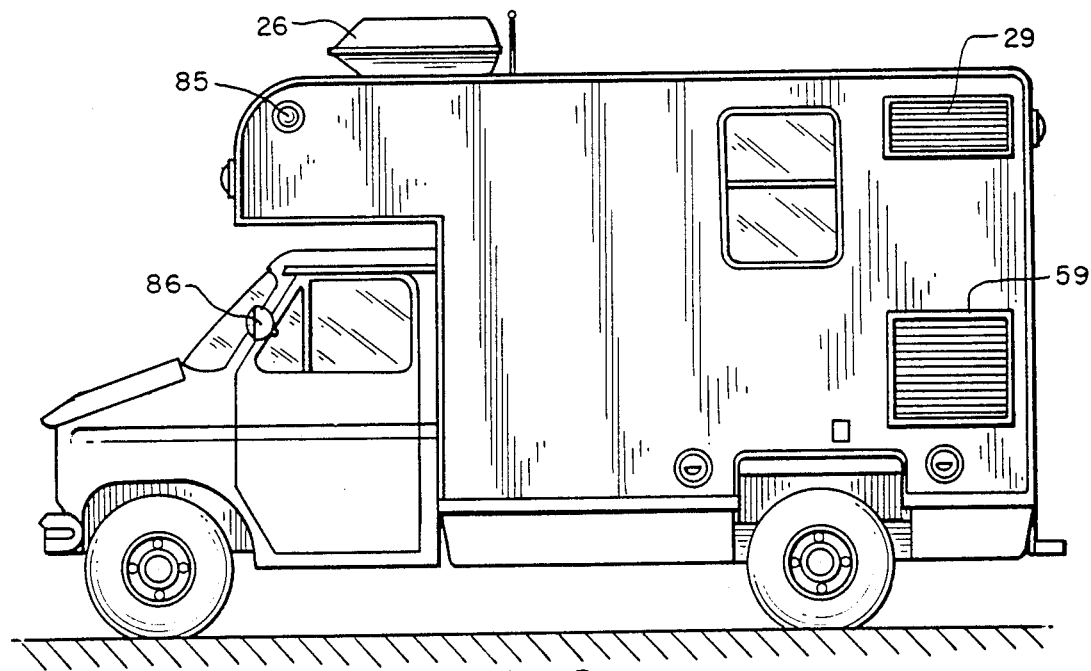
FIG. 6 is a right side view of the pizza preparation and delivery vehicle of FIG. 1.
Figure 7:
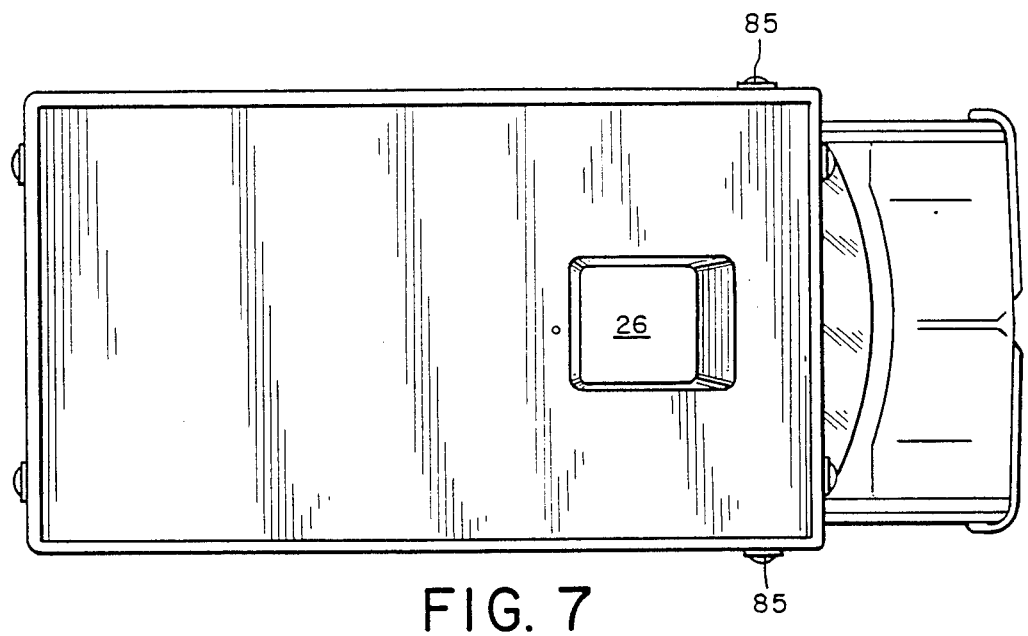
FIG. 7 is a top view of the pizza preparation and delivery vehicle of FIG. 1.
Figure 8:
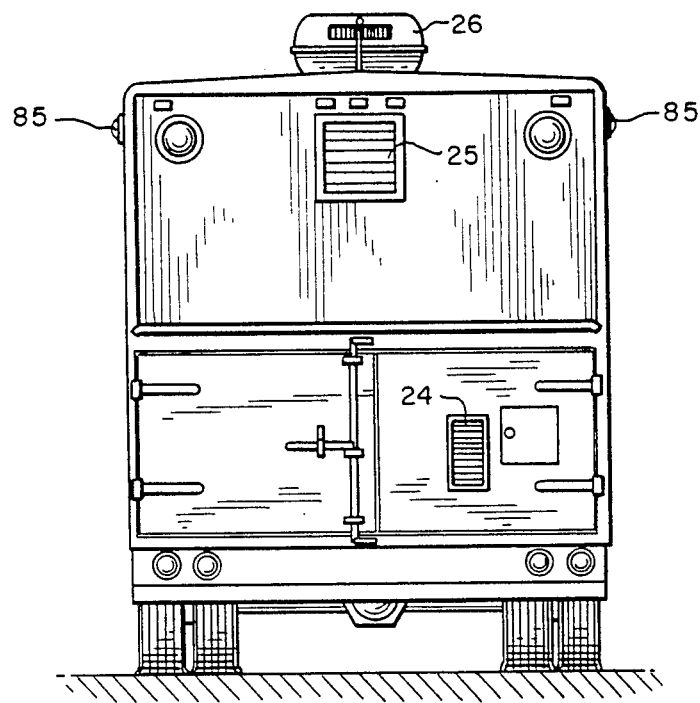
FIG. 8 is a rear view of the pizza preparation and delivery vehicle of FIG. 1.

A. The Apparatus of the Preferred Embodiments

Turning now to the drawings, FIGS. 1 through 27 all show various aspects of the same pizza preparation and delivery vehicle. The following discussion will address the various aspects of the preferred vehicle, and then the preferred method will be discussed.

1. The Preferred Vehicle Layout

FIGS. 1 through 8 show the vehicle layout for the presently preferred embodiment of the invention. Preferably the vehicle is a truck, such as the modified E-350 Ford shown in the drawings. The engine, drive train, cab and frame of the vehicle 1 are assembled by Ford Motor Co., while the body can be built by Utilimaster Corporation, 65266 State Road 19, P. O. Box 585, Wakarusa, Ind. 46573. The van portion of the vehicle 1 is a 10 foot long by 7 foot high cab over enclosure. The vehicle 1 is equipped with an eight cylinder engine and an automatic transmission. The vehicle 1 can be provided with floodlights 85 for safety in delivery and for alerting the customer to the arrival of the vehicle 1. Further, the vehicle 1 can be provided with a spotlight 86 for reading address numbers.

As can be seen in the Figures, the vehicle 1 generally includes a driver's station 2 and a kitchen area 3. In the preferred embodiment of the invention, a cook's chair 4 is provided in the kitchen area to optimize safety. However, any other suitable cook support means may be used in place of the chair 4, such as a horizontally disposed, waist-high support rail or a safety harness, for example. The kitchen area 3 is also equipped with a pizza preparation station 5, an oven 6 having a hood 7, a cutting table 10, an ice bin 11, and a beverage dispensing tower 12. An electrical generator 8, placed on a generator platform 9, supplies all the necessary power for the kitchen equipment by means of conventional electrical wiring.

The kitchen area 3 also includes storage space for delivery items, water and road safety equipment. Storage space 14 for delivery items is provided adjacent to the beverage dispensing tower 12. A water tank 16 is disposed adjacent to the storage space 14 and a sink 17, equipped with a hot water heater 54, is disposed between the water tank 16 and the pizza preparation station 5. A first waste water storage tank 118 is provided for the sink 17, and a second waste water storage tank 119 is provided for the ice bin 11 and the beverage dispensing tower 12. (See FIG. 21). In a far corner in front of the drink dispensing tower 12, storage space 15 for road emergency equipment is provided. The storage space 15 is accessible by an outside storage door 20.

The kitchen area 3 is equipped with an outside kitchen door 19 disposed adjacent to the cutting table 10. There are back doors 21 providing access to the generator 8. The kitchen area 3 also includes a curb side window 22 and a road side window 23. For ventilation purposes, there are also generator cooling air intake vents 59, a generator exhaust vent 24, hood intake vents 29, a hood exhaust vent 25 and an air conditioner 26.

The driver's station 2 is connected with the kitchen area 3 by a passageway 18. The driver's station 2 includes a radio 27, audible in the kitchen area 3 as well as in the driver's station 2, for communication with a home or commissary station for receiving delivery orders. Alternatively or in addition, communication means can also be provided for receiving delivery orders directly from customers. The driver's station 2 also includes a beverage supply holder 13, which is connected to the drink dispensing unit 12 in the kitchen area 3 by tubing 28. (See FIGS. 21 and 22.)

This preferred vehicle layout provides the important advantage that a person seated in the cook's chair 4 is restrained from involuntary movement due to vehicle acceleration. For the purposes of this invention, the term "acceleration" includes deceleration and change in direction of movement. Further, a person in the cook's chair 4 is at a working distance from the oven 6, pizza preparation station 5 and cutting table 10, so that preparation and cooking operations can be comfortably accomplished from the chair 4 while the operator is held in the chair 4 by a seatbelt. For the purposes of this invention, a "working distance" is a distance from which the operations can be accomplished without leaving the chair 4, and "preparation" of a pizza includes any assembly of a pizza product such as placing topping ingredients thereupon.

Having now described the pizza preparation and delivery vehicle in very general terms, we will now turn to the individual features of the preferred embodiment of the invention.

2. The Pie Case

FIGS. 9 through 14 show various views of a refrigerated pie case 30 for storing uncooked proofed pizza shells, and which also serves as the preparation station 5 in the presently preferred embodiment of the invention. The temperature of the pie case 30 is preferably maintained in the range of 35° F. to 40° F. The pie case 30 generally comprises a horizontally disposed base 31 from which depends a plurality of vibration isolators 32. A preparation surface 33 extends substantially parallel to the base 31. Between the preparation surface 33 and the base 31, the pie case 30 includes storage space 40 for pizza pans containing proofed (partially risen) dough. A plurality of nestable storage retainers 41 keeps the pizza pans securely positioned in the storage space 40.

Figure 25:
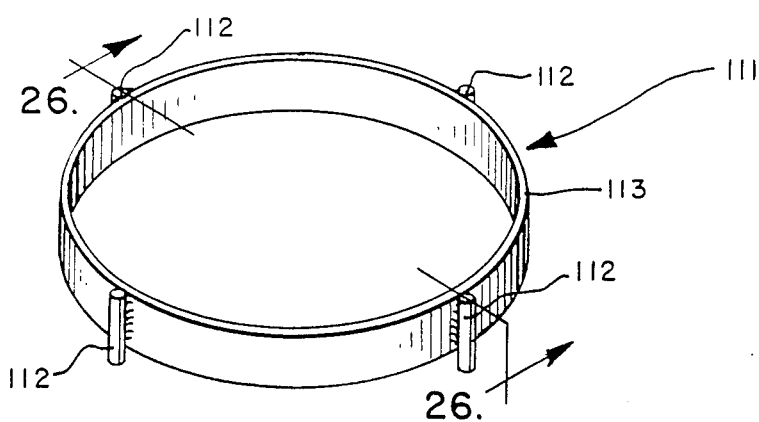
FIG. 25 is a plan view of a pan restraining ring of a preferred embodiment of the present invention.
Figure 26:
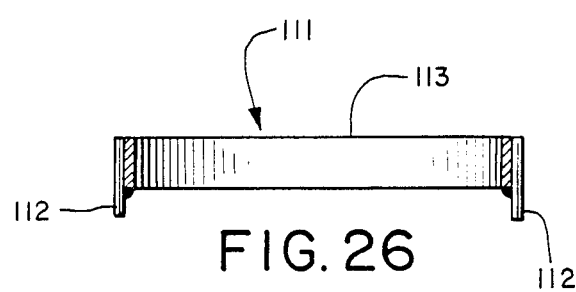
FIG. 26 is a partial cross-sectional view taken along line 26—26 taken along FIG. 25.

The preparation surface 33 is preferably a non-slip surface. In the preferred embodiment, the preparation surface 33 has a grid type structure and is provided with a raised peripheral rim 34. For the purposes of this invention, the terms "grid" and "mesh" are to be broadly construed to connote any structure adapted to engage cleats or lugs for restraining undesired translational movement of a pizza pan when the vehicle is in motion. In the presently preferred embodiment, the grid type structure of the preparation surface 33 is designed to keep pizza pans encircled by pan restraining rings 111 from sliding thereupon. The pan restraining rings 111 are shown in FIGS. 25 and 26, and comprise a ring structure 113 adapted to encircle a pizza pan. The ring structure 113 has a plurality of depending cleats 112. Of course, the pizza pans may be integrally formed with cleats 112. Thus, for the purposes of this invention, cleats are "connected" to the pizza pans irrespective of whether they are integrally formed therewith or whether they are connected by a ring structure or other suitable means.

A condiment tray 35 is preferably disposed at a rear edge 42 of the preparation surface 33. However, it can alternatively be positioned elsewhere at the periphery of the preparation surface 33. The pie case 30 and the condiment tray 35 are refrigerated by common air circulation with each other. The condiment tray 35 is equipped with a plurality of small condiment pans 114, a tray cover 36 having a handle 95, and a condensate drain 37. When food is placed in the small condiment pans 114 of the condiment tray 35, some condensate will accumulate. This condensate will pass through the condensate drain 37 to the region of an evaporator coil 38 and eventually will drain through a waste water drain 39 via a condensate pan 43.

In the presently preferred embodiment of the invention, a large condiment pan 84 is disposed at a front corner of the preparation surface 33. A dividing lip 89 is provided to separate the pan 84 from the remainder of preparation surface 33. A condiment storage bin 87 is provided at a back corner of the preparation surface 33, behind the pan 84. A condiment shelf 122 holds condiments stored in the bin 87.

Figure 14:
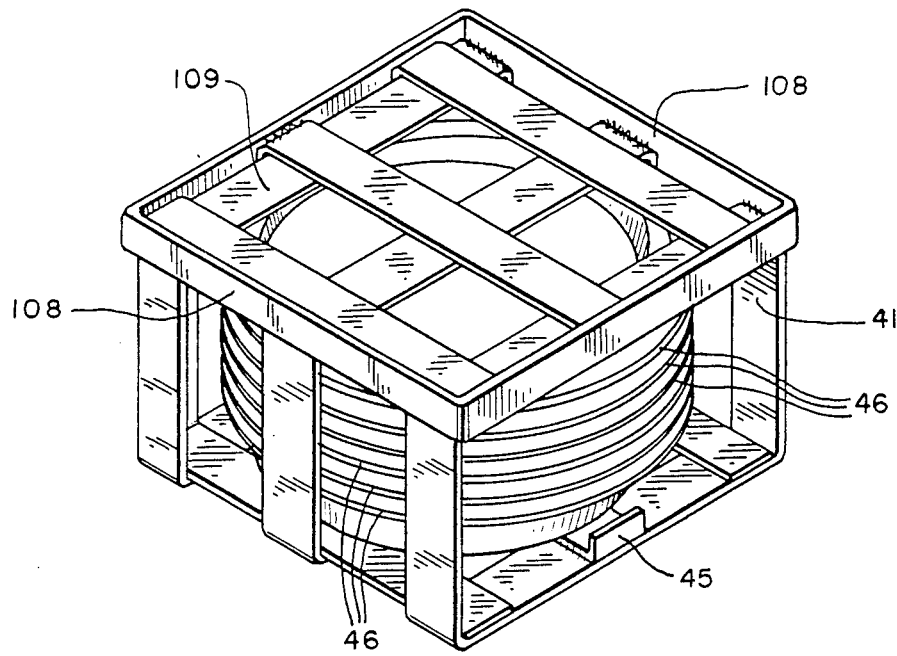
FIG. 14 is a perspective view of stacked pans in the nestable storage retainers of FIG. 9.
Figure 14A:
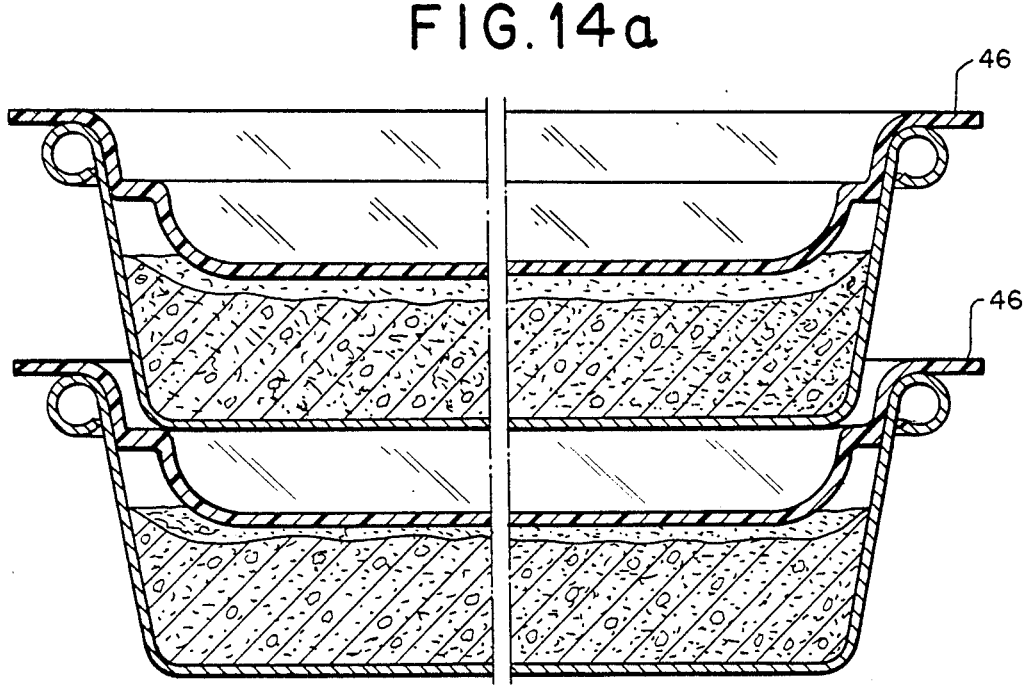
FIG. 14a is a cross sectional view of the stacked pans of FIG. 14.

The storage space 40 preferably includes the nestable storage retainers 41 shown in FIG. 14. A stacking rim 108 is provided around the periphery of a top surface 109 of the retainers 41, so that the retainers 41 can nest when they are stacked in the storage space 40. The storage retainers 41 are also provided with a stop 45, to prevent stored pans from sliding out. The storage retainers 41 are removable from the storage space 40 so that they can be easily loaded with pizza pans. Pizza pans can be stacked in the retainers 41 with stacking plates 46 between the pans as shown in FIGS. 14 and 14a. The retainers 41 can be loaded at a commissary and then inserted into the storage space 40 prior to transit.

By way of example, the pie case 30 can be prepared from 18-gauge stainless steel by conventional construction techniques, with insulated stainless steel sliding doors 44 and with a 20-gauge galvanized base 31. The front vibration isolators 32 are mounted to the base 31 in a C-channel 123, while the rear vibration isolator 32 is mounted on a T-shaped leg 116 secured in an elongated U-shaped channel 117. The position of the leg 116 can be adjusted in the channel 117. Suitable vibration isolators 32 can be obtained from Bushings, Inc., 4358 Coolidge Highway, P.O. Box 189, Royal Oak, Mich. 48068, as "dual flex marine and industrial engine vibration isolators". As shown in FIGS. 13, 13a and 13b, the preferred vibration isolators 32 comprise an outer aluminum casting 47 that sandwiches a flexible, elastomeric insert 48 between the casting 47 and a base support tube 49. The insert 48 isolates the tube 49 from vibration of the casting 47. A suitable grid type structure for the preparation surface 33 can be provided by expanded aluminum. Alternatively, a non-slip elastomeric material may be used, such as a rubber mat.

The following dimensions are given also by way of example. In the presently preferred embodiment, the outside dimensions of the pie case 30 are about 28 inches deep by about 64 inches long by about 37½ inches tall from the base 31 to the preparation surface 33. The base 31 of the pie case 30 is raised about 9½ inches from the chassis of the vehicle 1. This is high enough to comply with local health regulations and yet low enough to minimize the effect of truck vibrations. The preferred inside dimensions of the storage space 40 are about 17½ inches deep by about 48 inches long by about 28 inches tall. This storage space 40 will accommodate two stacks of two large retainers 41 and one stack of two medium retainers 41. Four retainers 41 having a depth and a width of about 16 inches and a height of about 10½ inches are provided for stacking large pizza pans, while two retainers 41 having a depth and width of about 14 inches and a height of about 10½ inches are provided for stacking medium pizza pans. The retainers 41 may be constructed from 16-gauge stainless steel. The rim 34 of the preparation surface 33 is about 1 inch deep by about ¾ inch high. The condiment tray 35 has preferred outside dimensions of about 9½ inches deep by about 51 inches long by about 5½ inches high.

The preferred pie case 30 serves several functions. The storage space 40 conveniently stores proofed and partially topped pizza dough. The dough is maintained there in good condition, in part because the vibration isolators 32 minimize the effect of the vibrations of the vehicle 1. Another function of the pie case 30 is that the preparation surface 33 conveniently and securely holds a pizza during the assembly process. Further, the condiment tray 35, the large condiment pan 84 and the condiment storage bin 87 serve the function of providing convenient access to a variety of pizza toppings stored therein. This multiplicity of functions served by the pie case 30 provides for highly efficient use of space in the kitchen area 3.

3. The Oven, Hood and Generator

Figure 15:
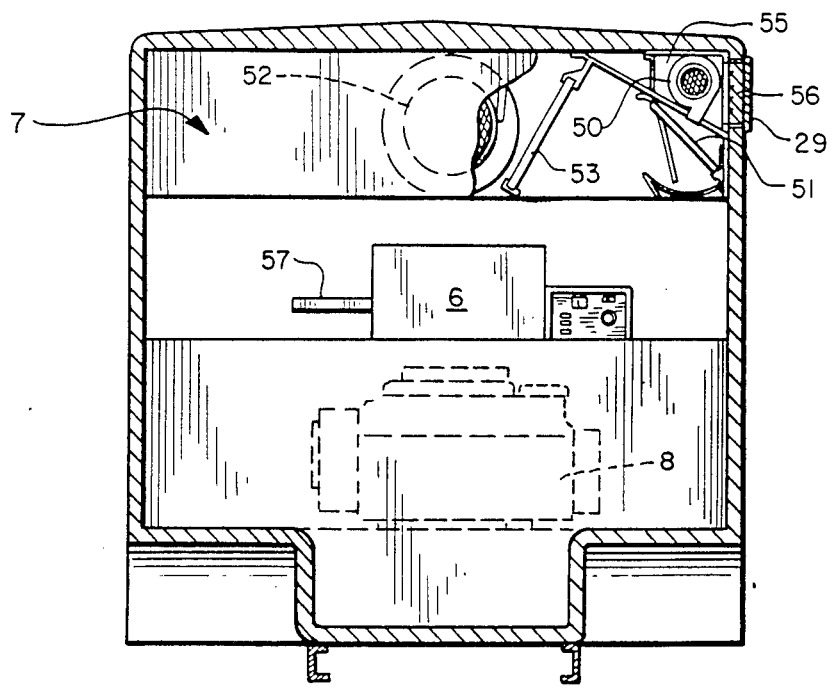
FIG. 15 is a front elevation view of the oven and hood taken along line 15—15 of FIG. 3.

FIG. 15 shows the preferred relationship of the oven 6, the hood 7 and the generator 8. The oven 6 is preferably a conveyor oven having a conveyor belt 57. A particularly suitable conveyor belt 57 has a chain or mesh surface such that cleats 112 on the pan restraining rings 111 will engage the conveyor belt 57, thereby preventing pizza pans encircled by restraining rings 111 from sliding on the conveyor belt 57. A suitable oven is the WEAR-EVER IMPINGER ™ II by Lincoln Manufacturing Company, Inc., Model No. 1103. This oven may be obtained from Lincoln Manufacturing Company, Inc., 1111 North Hadley Road, Ft. Wayne, Ind. It has the capacity to bake about twelve 13-inch pizzas per hour.

The preferred hood 7 is described in complete detail in U.S. patent application Ser. No. 599,496, now U.S. Pat. No. 4,556,046, entitled *Hood for Oven in Pizza Delivery Vehicle* and assigned to the assignee of the present invention. Although the details of the hood form no part of the claimed invention of the instant application, they are included in this description so that the presently preferred embodiment can be fully understood. The hood 7 generally comprises two intake fans 50 which draw air from outside to inside the vehicle 1 through two intake vents 29, and direct the air through two intake filters 51. An exhaust fan 52 is disposed adjacent to the back wall between the intake fans 50. The exhaust fan 52 draws air through exhaust filters 53 and exhausts the air from inside to outside the vehicle 1. The air, as it is directed from the sides of the hood 7 to the center thereof by the intake fans 50, and drawn out through the back of the vehicle 1 by the exhaust fan 52, draws with it fumes from the oven 6.

The intake fans 50 are preferably kept free from excessive moisture. They are housed in insulated intake chambers 55. The intake chambers 55 are insulated to reduce the migration of noise generated by fan motors, as well as to prevent condensation from forming on the walls of the intake chambers 55 and damaging the motors of the intake fans 50. In the preferred embodiment of the invention, the intake vents 29 have fixed louvers 56 shaped to impede water droplet flow from outside to inside the vehicle 1.

The hood 7 also includes a back draft damper (not shown) disposed downstream of the exhaust fan 52. Hinged louvers on the back draft damper fall into a closed position when the exhaust fan 52 is turned off, thereby preventing a back draft through the hood 7. The degree to which the hinged louvers can open is adjustable. The hinged louvers are pivotally attached to a connecting bar, which moves downwardly when the louvers move to an open position. A balancing screw, attached to a lower portion of the back draft damper, provides a stop surface which limits the downward motion of the connecting bar to a desired point. The adjustment is made so that a balanced system or a very slight negative pressure in the hood area is maintained.

The generator 8 is disposed on the generator platform 9. It is enclosed in a plywood housing 58 lined with metal on the generator side. A metal oxide-dispersed urethane foam is attached to the inner, metal liner to insulate the kitchen area 3 from heat and noise emanating from the generator. This noise suppressing housing 58 permits the generator to run at maximum output with little distraction to a person inside the vehicle 1. Preferably, the generator is a 110 volt/220 volt alternating current power supply. The generator 8 provides power for the oven 6, the pie case 30, the condiment tray 35, the lights, the radio 27, the hood 7 and the air conditioner 26. The generator is fueled from the same fuel system that feeds the vehicle motor, but the generator operates independently of the vehicle motor, irrespective of whether the vehicle motor is or is not running. A suitable generator is of the type A15.0 JC-Genset ™ by Onan Corporation, 1400 73rd Avenue N.E., Minneapolis, Minn. The capacity of this generator is 15 KW at 1800 RPM.

4. The Cutting Table

Figure 16:
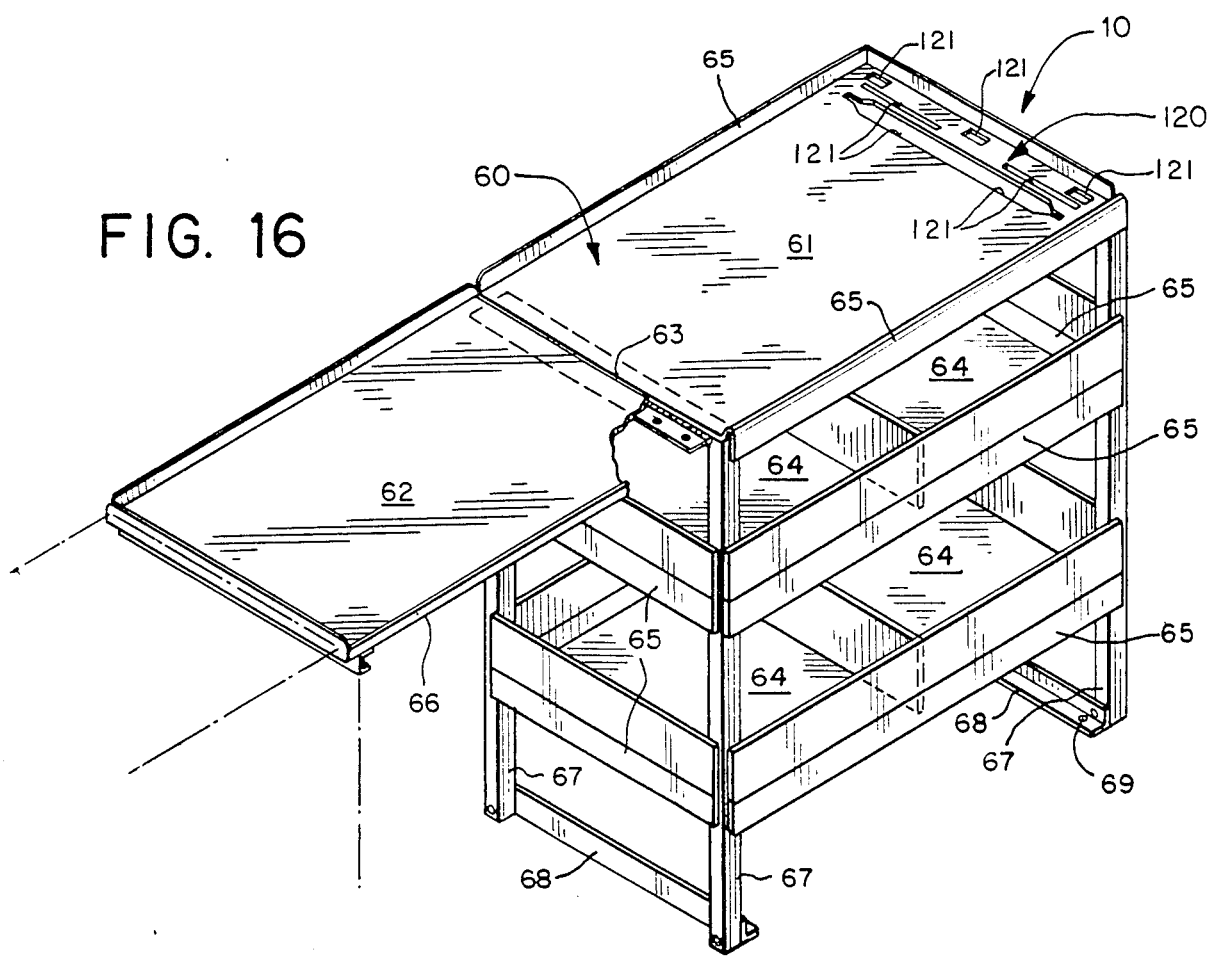
FIG. 16 is a perspective view of the pizza cutting table of the vehicle of FIG. 1.
Figure 17:
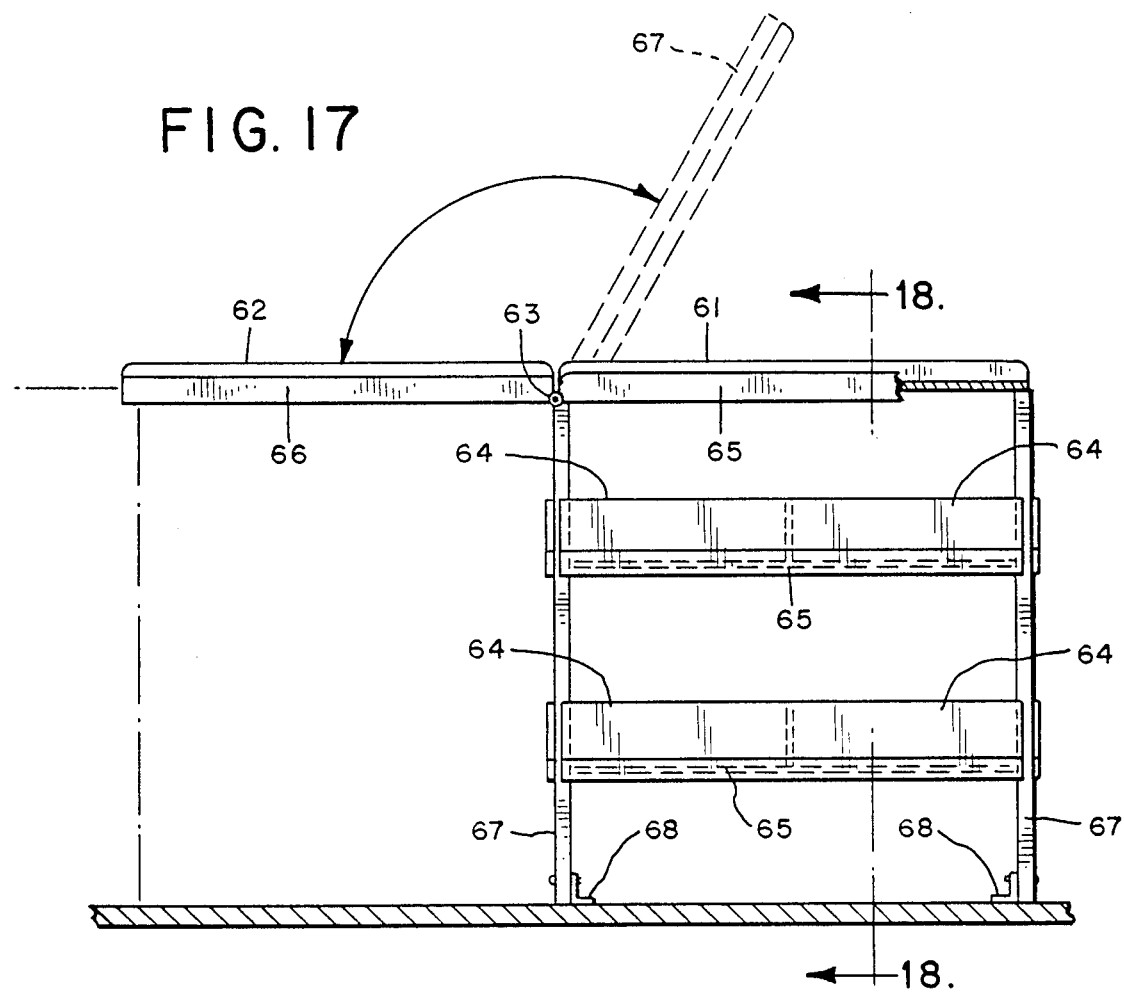
FIG. 17 is a front elevation view of the cutting table of FIG. 16.
Figure 18:
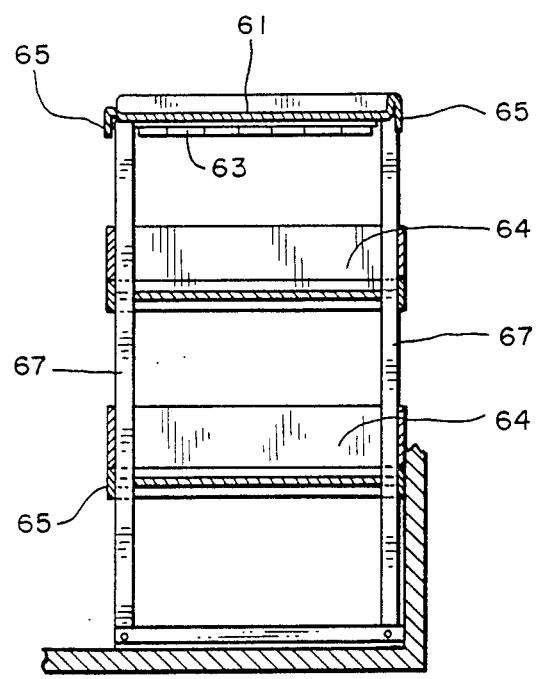
FIG. 18 is a transverse cross sectional view taken along line 18—18 of FIG. 17.

The preferred cutting table 10 is shown in FIGS. 16 through 18. The cutting table 10 has a hinged top surface 60 which comprises a first section 61, a second section 62 and a piano hinge 63 dividing the first and second sections. The cutting table 10 also has a plurality of lower shelves or compartments 64 for storing such items as hot pans. There are rims 65 around the top surface 60 and the shelves 64 so that materials placed thereupon will not slide off in transit. The second section 62 of the hinged top surface 60 can be folded up in the direction of the first section 61 thereof, to provide a passageway to the outside kitchen door 19. The shelves 64 below the hinged top surface 60 extend only as far as the first section 61 of the hinged top surface 60, so that when the second section 62 is folded up there will be free access to the door 19. If desired, the top surface 60 can be designed so that the second section 62 folds completely flat against the first section 61. In such a case, the underneath portion of the second section 62 can be provided with a cutting surface 66.

In the presently preferred embodiment a smallwares holder 120 is integrally formed with the first section 61 of the top surface 60 of the cutting table. This smallwares holder 120 comprises a plurality of slots 121 for holding pizza cutting tools, spatulas and the like.

It is presently preferred that the cutting table 10 be a three shelf unit as shown. The cutting table 10 can be made by conventional construction techniques. By way of example, the hinged top surface 60 is disposed at a level of about 37½ inches from the chassis, and has dimensions of about 21 inches deep by about 65 and ¾ inches long. The shelves 64 are about 21 inches deep by about 33 inches long, and have rims 65 about 4 inches high. If desired, the shelves 64 can each be provided with high rims and divided into two compartments, as shown in FIGS. 16 through 18. The shelves 64 and the top surface 60 are constructed from 16-gauge stainless steel with #4 finish. Four legs 67, constructed from 12-gauge 1 inch by 1 inch stainless steel angle, support the shelves 64 and the top surface 60. The legs 67 are themselves welded to similarly constructed supports 68 having fastener holes 69 for securing the cutting table 10 to the chassis of the vehicle 1.

The top surface 60 of the cutting table 10 is used to cut and box cooked pizzas. The shelves 64 can be used for storing used pizza pans and boxes.

5. The Ice Bin

Figure 19:
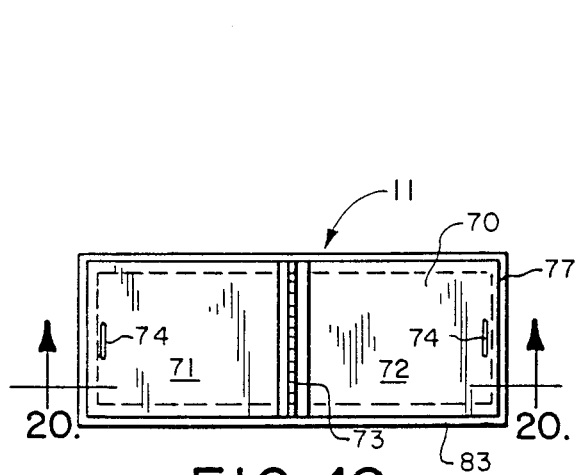
FIG. 19 is a plan view of the ice bin of the vehicle of FIG. 1.
Figure 20:
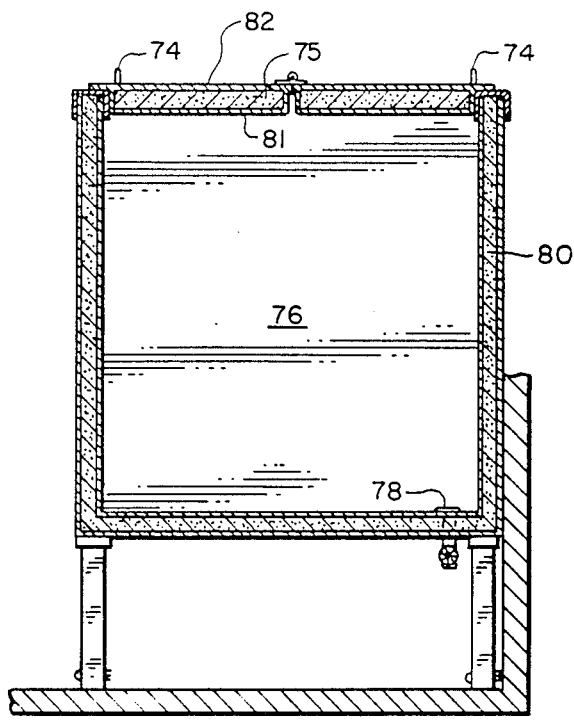
FIG. 20 is a transverse cross sectional view taken along line 20—20 of FIG. 19.

FIGS. 19 and 20 show the preferred ice bin 11 of the present invention. First it should be noted that the ice bin 11 comprises a ledge 83 upon which the second section 62 of the hinged top surface 60 rests when the cutting table 10 is in its normal position in transit.

The ice bin 11 generally comprises a lid 70 and a basin 76. The lid 70 rests upon a rim 77 of the ice bin 11, where said rim 77 encircles the top opening 79 of the ice bin and includes the ledge 83 thereof. The lid 70 has a first section 71 and a second section 72. The first section 71 and the second section 72 are joined by a piano hinge 73. Preferably, each of the first and second sections 71, 72 has an inner stainless steel skin 81, an outer stainless steel skin 82, one inch thick insulation 75 therebetween and a handle 74 secured to the outer stainless steel skin 82. The basin 76 has a ½ inch drain valve 78. The basin 76 is also provided with 1½ inch polystyrene insulation 80 on all sides and the bottom thereof, and is constructed from 18-gauge stainless steel. Of course, these details of construction can be varied.

The ice bin 11 of the presently preferred embodiment has outside dimensions of about 12¼ inches wide by about 27½ inches long by about 28 inches tall, and is elevated about 9½ inches from the floor. The inside dimensions are about 8 and ¾ inches wide by about 24 inches long by about 26 and ⅜ inches tall.

The location of the ice bin 11 in the kitchen area 3 serves several purposes. First, since the ice bin 11 is used for storing ice to be served in cold beverages, the ice bin 11 is conveniently near the beverage dispensing tower 12. Further, the ice bin 11 is suitably located after the cutting table 10 in the direction of work flow. Still further, the ledge 83 of the ice bin 11 serves as a support for the second section 62 of the cutting table 10. Hence, it can be seen that the illustrated arrangement of the kitchen area 3 has the advantages of optimizing use of the available space and of providing for a convenient and efficient single direction of work flow.

6. The Drink Dispensing Tower And Beverage Supply Holder

Figure 21:
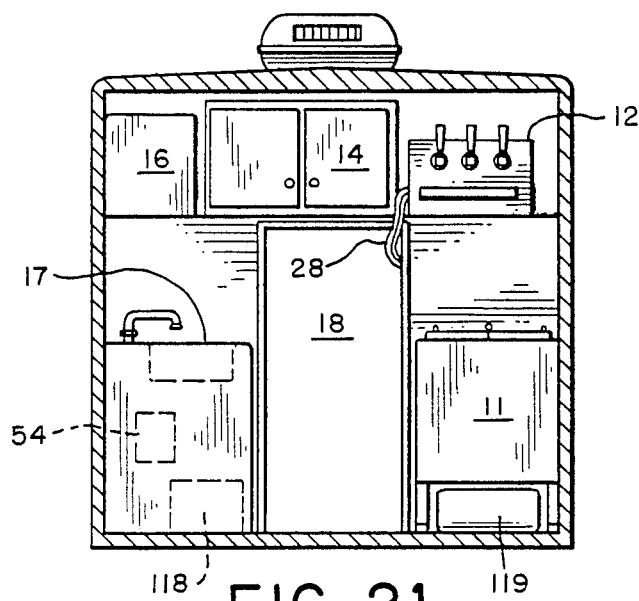
FIG. 21 is a front elevation view of the front of the inside compartment taken along line 21—21 of FIG. 3.

FIG. 21 shows the front of the inside compartment of the truck that extends over the driver's station 2. As is best seen in this Figure, the beverage dispensing tower 12 is connected by tubing 28 which passes through the passageway 18 between the kitchen area 3 and the driver's station 2. This tubing 28 leads to the beverage supply holder 13 which will be presently discussed.

Figure 22:
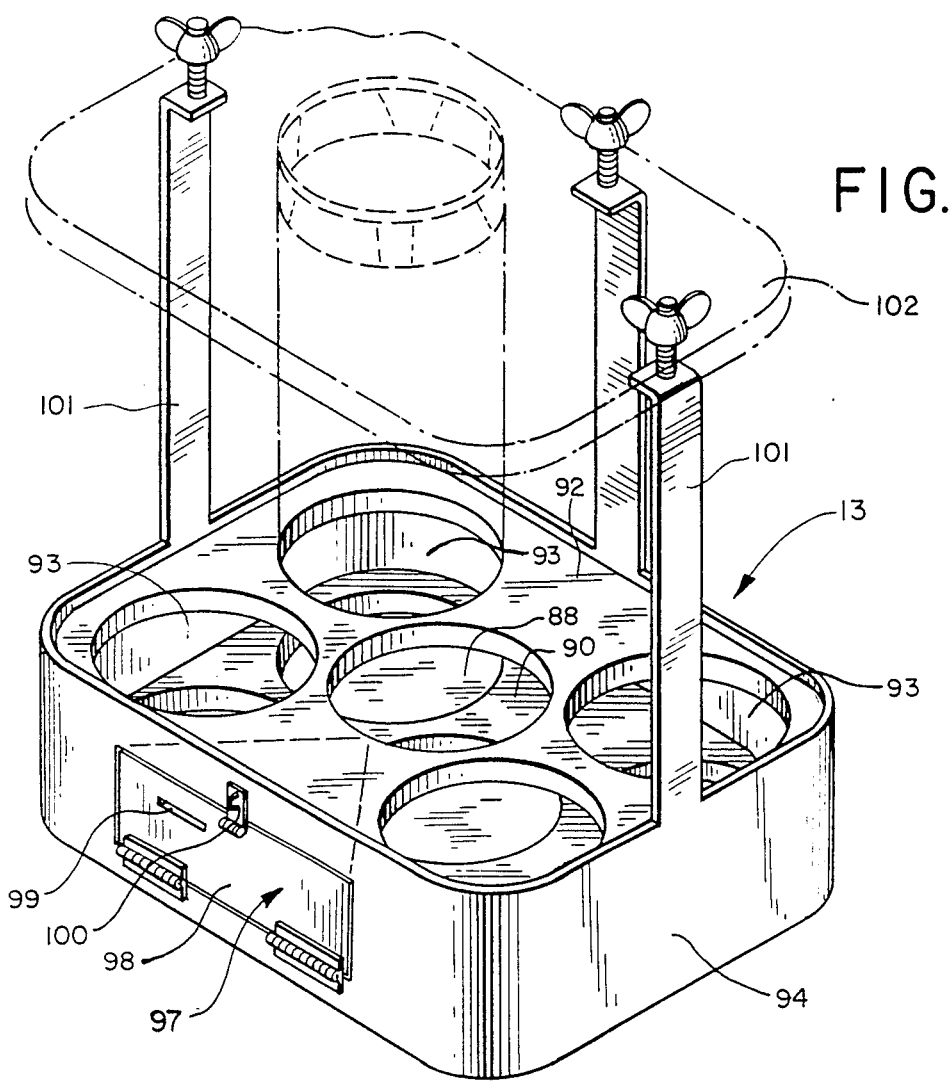
FIG. 22 is a perspective view of the beverage supply holder of the vehicle of FIG. 1.
Figure 23:
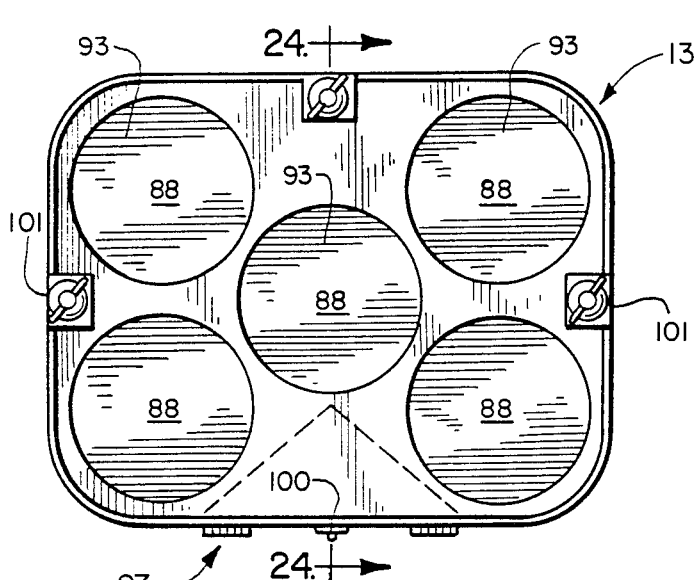
FIG. 23 is a plan view of the beverage supply holder of FIG. 22.
Figure 24:
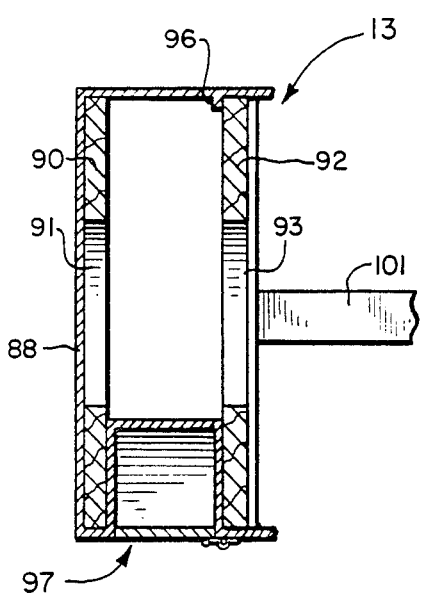
FIG. 24 is a transverse sectional view taken along line 24—24 of FIG. 23.

The beverage supply holder 13 is shown in FIGS. 22 through 24. In the presently preferred embodiment, it holds a plurality of premix tanks and a carbon dioxide cylinder. Alternatively, the beverage supply holder could contain syrup tanks, for example. The beverage supply holder 13 includes a plate or floor 88 underlying a lower retaining shelf 90, and a lip 96 underlying an upper retaining shelf 92. The lower retaining shelf 90 defines a plurality of openings 91, and the upper retaining shelf 92 defines a plurality of openings 93 aligned with openings 91. A frame 94 encircles the floor 88, lower retaining shelf 90, lip 96 and upper retaining shelf 92. The openings 91, 93 are sized to accommodate the premix tanks and the carbon dioxide cylinder (not shown). A safety cap 102, supported by legs 101 projecting upwardly from the frame 94, is provided to prevent the tanks and the cylinder from coming out of the beverage supply holder.

The beverage supply holder 13 also includes a cash box 97 partially concealed therein. The cash box 97 is disposed between the lower retaining shelf 90 and the upper retaining shelf 92. Preferably, the floor 88 of the beverage supply holder 13 is fastened to the chassis of the vehicle 1, for example by bolting, so that it cannot easily be removed therefrom. The cash box 97 includes a hinged door 98 with locking means 100 affixed thereto. There is a slot 99 in the hinged door 98 for inserting the pizza delivery payments into the cash box 97.

The beverage supply holder 13 can be made by conventional construction techniques. By way of example, the upper retaining shelf 92 and lower retaining shelf 90 can be made from ¾ inch thick plywood 95. The floor 88 can be made from 12-gauge sheet metal 96, and the legs 101 can be constructed from 2 inch by ¼ inch black iron. The frame 94 and the cash box 97 can also be made from ¼ inch black iron. A suitable beverage dispensing tower 12 can be obtained as a Model SE-1522-3 pre-mix special events chest from Sitco Stainless Ice-Tainer Company at 702 San Fernando, P.O. Box 1327, San Antonio, Tex. 78295.

Distinct advantages flow from the multiple functions of the beverage supply holder 13 here described. The beverage supply holder 13 is installed next to a driver's chair (not shown) in the driver's station 2 and thus does not take up space in the kitchen area 3. Further, the beverage supply holder 13 camouflages and immobilizes the cash box 97, thus providing a significant measure of security. Still further, the cash box 97 is easily accessible to the driver who preferably delivers the pizza and takes the money.

7. The Cook's Chair

Figure 27:
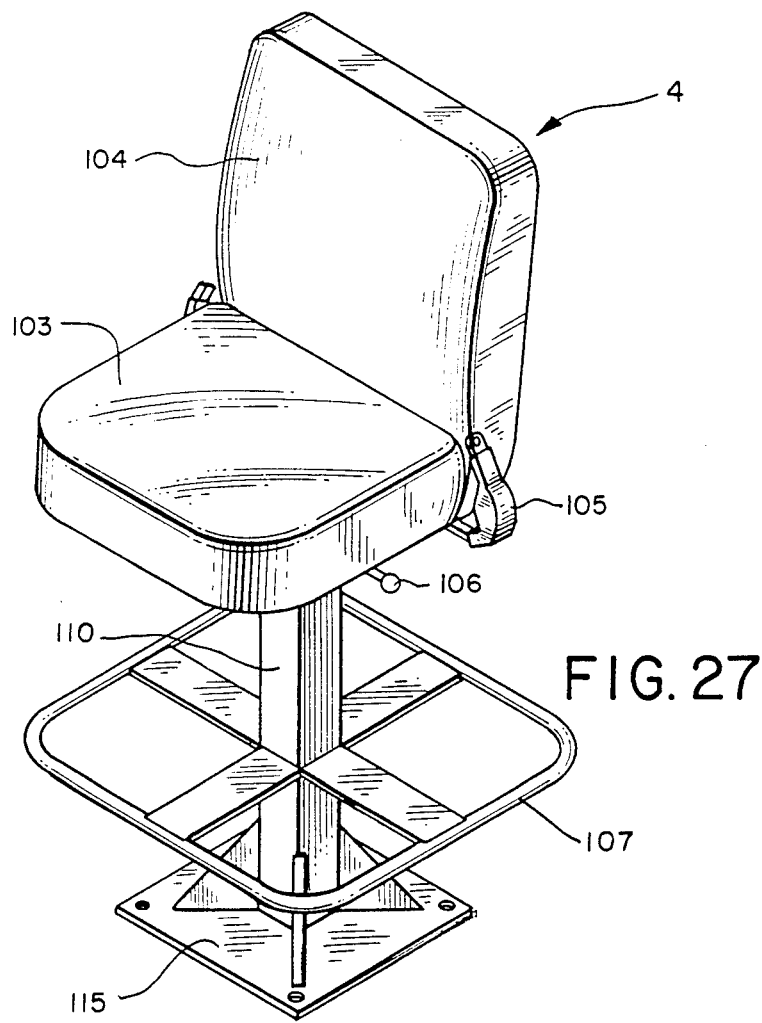
FIG. 27 is a perspective view of the cook's chair of the vehicle of FIG. 1.

FIG. 27 shows the presently preferred cook's chair 4 disposed in the kitchen area 3. The chair 4 has a seat portion 103, a back portion 104, a swivel post 110 and a base 115. The base 115 of the chair 4 is fastened, for example by bolting, to the chassis of the vehicle 1. A safety belt 105 is provided for securing the cook in the chair 4. A suitable height for the seat portion 103 is about 30½ inches from the chassis of the vehicle 1. A foot rest 107 can be used by the cook for rotating the seat portion 103 and back portion 104 of the chair 4 relative to the chassis.

A swivel lock (not shown) is provided to hold the cook's chair 4 in positions 90° apart such that it faces the driver's station 2, the preparation station 5, the oven 6 or the cutting table 10. The locking mechanism is released by means of a lever 106.

B. The Method

Figure 28:
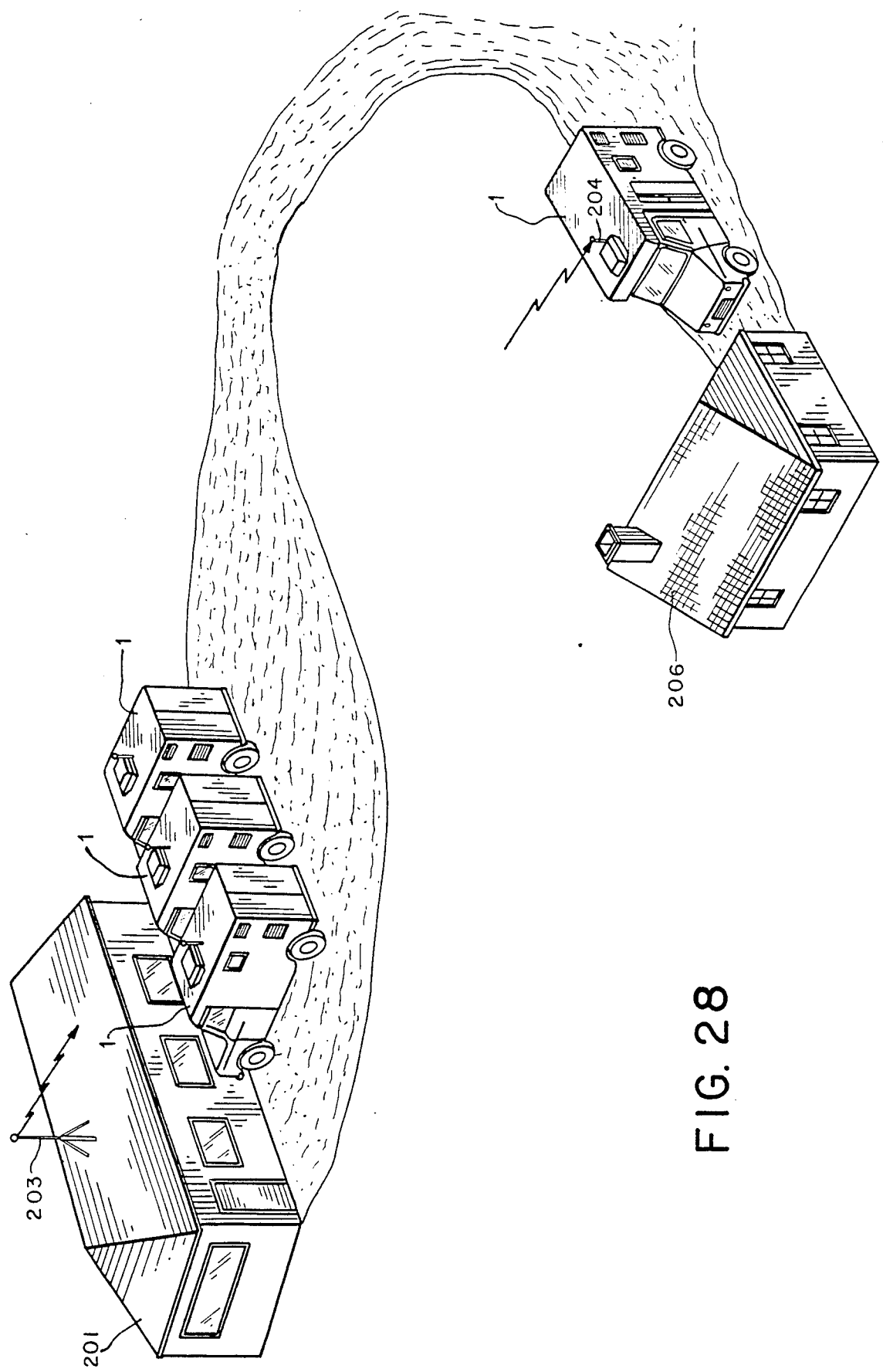
FIG. 28 is a schematic representation of the preferred method of the present invention.

The preferred method of the present invention is represented schematically by FIG. 28. A customer's pizza order is received at a home station and commissary 201. By means of the radio system 203 and 204, the order is transmitted to one of the pizza preparation and delivery vehicles 1. The personnel in the vehicle then complete preparation of the pizza according to the customer's order and deliver it to the customer 206. Preferably, the home station and commissary service a fleet of vehicles 1, by supplying them with the necessary pizza ingredients and by dispatching the customer pizza orders.

According to a preferred method of practicing the present invention, a pizza cooking procedure is used which is the subject of U.S. patent application Ser. No. 599,448 entitled *Method for Preparing Pizza* and assigned to the assignee of the present invention. According to this method, it has been found that pizza dough tends not to collapse in transit if it is proofed and covered with a layer of sauce and a layer of cheese before it is stored in the pie case.

A basic pan-type pizza dough is used in the preferred embodiment, but the invention can also be adapted, for use with other pizza doughs. The amount of dough used for a medium pan pizza (12 to 13 inch) is about 18 ounces and the amount of dough used for a large pizza (14 to 15 inch) is about 25 ounces. The dough is prepared by mixing it, portioning it, running it through a dough sheeter, placing it in a pizza pan, covering it and placing it in a heated cabinet at about 85° to 105° F. to rise for about 1 hour and 15 minutes or until it reaches a height of about ¾ of an inch to 1 inch.

According to the preferred method of the present invention, the pizza is partly assembled before transit, preferably by covering the proofed dough with a layer of sauce and a lower layer of cheese before storing it in the pie case. For the purpose of this invention, "prior to transit" means before the vehicle begins a trip to a delivery destination. Conversely, "in transit" or "en route" means at any time after an order is received and the vehicle is dispatched to a delivery destination. Note that the vehicle need not actually be in motion when in transit.

The sauce is not preheated but otherwise a suitable sauce is identical to that described in the patent to Brummett et al., U.S. Pat. No. 4,367,243. Preferably, the natural tomato soluble solids of the sauce are in the preferred range of 10 to 14%. Most preferably, the natural tomato soluble solids of the sauce is about 11.1%. In the presently preferred embodiment, a medium pizza is made with about 5 ounces of sauce, and a large pizza is made with about 7½ ounces of sauce. The preferred cheese is a low moisture part skim mozzarella cheese having a moisture content of about 47½% to about 50½% and a fat content of about 33% to 37% on a dry basis. Preferably, a medium pizza is partially assembled with about 3¼ ounces of cheese and a large pizza is partially assembled with about 4 and ¾ ounces of cheese.

Assembly and cooking of the pizza is completed by a pizza cook in transit to the delivery destination. The pizza cook is preferably seated in the cook's chair 4 during the assembly and cooking operations. First, the cook faces the pie case 30 in the cook's chair 4 and removes a pizza pan from the pie case 30 and places a pan restraining ring 111 around the rim thereof. The pan and restraining ring 111 are then placed on the pizza preparation surface 33 such that the cleats 112 of the restraining ring 111 cooperate with the grid or mesh structure of the preparation surface 33 to prevent the pan from sliding upon the preparation surface 33 while the vehicle 1 is in transit. The cook assembles the pizza by selecting toppings from the condiment tray 35 and placing them over the lower layer of cheese. An upper layer of cheese, having a weight of about twice that of the lower layer, is then placed over the toppings.

According to the presently preferred embodiment, a food weighing scale is not included in the kitchen area for weighing out the various toppings. Instead, several alternative methods of measuring out the toppings are used. The methods include: weighing and bagging portions of topping ingredients at the commissary or home station prior to transit, and placing the preweighed portions in the condiment tray 35; using coded measuring cups of different sizes for the different ingredients (the cups may be coded by color, by number or by the ingredient name, for example); counting out a preselected number of approximately uniform pieces of the ingredients (this is suitable for slices of pepperoni, for example); and scooping up a measured amount of the ingredients (for example, this may be used for wet ingredients such as olives). These methods for measuring may be used separately or in combination depending upon the types of ingredients to be used.

Once pizza assembly is completed, the cook rotates the cook's chair 4 such that the cook faces the oven 6 while seated in the cook's chair. The cook then places the fully assembled pizza on the conveyor belt 57 of the oven 6. The cleats 112 prevent the pan from sliding in the oven 6 because they engage the conveyor belt 57. The preferred cooking temperature is about 490° to 510° F. and the preferred cooking time is about 10 to 12 minutes for 13 inch and 15 inch pizzas. However, the temperature and time can be varied as needed from about 450 to about 550° F. and from about 6 to about 15 minutes.

After the pizza is cooked, the cook removes it from the oven 6, rotates the cook's chair 4 to face the cutting table 10, and places the pizza on the cutting table 10 where it is cut and boxed. Once the vehicle 1 has stopped at a delivery destination, the cook leaves the cook's chair 4 to prepare the iced beverages using ice from the ice bin 11 and carbonated beverages from the drink tower 12. The prepared iced beverages can be held in an upright position and delivered in a suitable beverage carrier tray (not shown). Paper cups for the beverages and the beverage carrier trays, as well as napkins, paper plates and pizza boxes, may be removed from the storage space 14.

After the pizza is boxed and the iced beverages are prepared, the cook has the option of either passing the goods through the passageway 18 to the driver in the driver's station 2, or else folding up the second section 62 of the cutting table 10 and taking the goods out of the vehicle 1 through the outside kitchen door 19. The iced beverages and the pizza are then delivered to the customer. The customer will pay for the delivered products, and the money will be placed in the cash box 97. The cash box 97 is preferably locked and the key is left at a home station or commissary. For the purposes of this invention, a "home station" or "commissary" includes any location where pizza delivery orders can be received from customers and dispatched to the pizza preparation and delivery vehicles.

A mobile and home station radio system is used for taking orders. All of the pizza delivery vehicles will be able to communicate by mobile radio with the home station or commissary where the home station radio is situated: A suitable mobile radio is the Motrar TM 5 Mobile Radio by Motorola Communications and Electronics, Inc., 1301 E. Algonquin Road, Schaumburg, Ill. 60196. For the home station, Motorola Communications and Electronics, Inc. also provides a Motrar TM 5 Trunked Mobile Flash Control Station Radio, equipped for up to a five channel mobile operation. A special channel frequency is rented from a regional tower and permits private communication between a dispatcher and truck personnel.

When the preferred method of the present invention is practiced, the pizza preparation and delivery vehicle is operated, in the manner that has been described, by a two person team consisting of a driver and a pizza cook. In view of hygiene considerations, in the presently preferred method the work is divided such that the pizza cook handles the food and the driver handles the money.

Alternatively, in off-peak hours or in sparsely populated areas, the pizza preparation and delivery vehicle can be operated by a single person. In such a case, the driver would execute the pizza preparation operation while the vehicle is in transit but not moving. The pizza cooking operation would take place while driver is at the wheel. Position indicator lights in the driver's station 2 would be provided to alert the driver of the cooking operation. If a conveyor oven is used, for example, a whisker indicating switch can be provided such that a yellow light alerts the driver that the pizza is leaving the oven and a red light alerts the driver that the pizza has completely left the oven. The switches are activated when the pizza pan contacts the whisker.

The pizza preparation and delivery system of the present invention offers numerous advantages. A most important advantage is that the pizza preparation and delivery system of the present invention provides freshly baked, restaurant quality pizzas delivered directly to the customer. Further, the preferred embodiment of the invention includes a beverage dispensing unit and an ice bin so that customers are also provided with freshly dispensed cold iced beverages.

Yet another advantage of the present invention is the efficiency of the pizza preparation system. The preferred layout of the kitchen area facilitates the pizza preparation operation. The kitchen area is arranged so that the cook can proceed with the preparation, cooking, cutting and boxing operations in an orderly fashion, and in a single direction of work flow. For example, the cook simply has to rotate the cook's chair 4 into successive positions in a single direction as he progresses through the method steps described herein of preparation, cooking, cutting and boxing.

Still another advantage of the present invention is that the design of each of the kitchen components is highly suited to the preparation of pizzas while in transit. The pan restraints and the grid type surface of the pizza preparation station cooperate to prevent the pizza from sliding on the preparation surface. Similarly, the wire mesh type conveyor belt of the conveyor oven described herein also cooperates with the pan restraints to maintain the pizza pan position on the conveyor belt. This assures proper cooking time, product safety and operator safety during the cooking operation.

Yet a further advantage of the present invention is provided by the beverage supply holder which camouflages the cash box. This concealment of the cash box provides a significant measure of security for the owners of the pizza delivery system as well as for the personnel operating the system.

In summary, the present invention provides an efficient and safe pizza preparation and delivery system. Now the pizza enthusiast can enjoy a restaurant quality pizza delivered to his home or place of work.

It should be understood that the present invention is not limited to the precise vehicle layout, equipment and method described above. Rather, a wide range of modifications can be made to the system of the present invention without departing from the spirit thereof. For example, the kitchen components can be placed in any convenient arrangement, or a conventional deck oven can be used instead of a conveyor oven. Further, the carbonated beverages can be served in prepackaged bottles or cans instead of by means of the dispensing tower described herein. In addition, materials, details of construction and dimensions can be varied as needed to suit individual applications. It is therefore intended that the foregoing detailed description be regarded as illustrative rather than limiting, and that it be understood that it is the following claims, including all equivalents, which are intended to define the scope of this invention.

We claim:

1. A method for preparing pizza in a pizza delivery vehicle, comprising:
   providing a pizza delivery vehicle comprising: means for receiving pizza delivery orders; a refrigerated pie case with uncooked pizza dough stored therein; a preparation station equipped with a variety of topping ingredients; and an oven;
   while in transit, receiving a pizza delivery order;
   while in transit, removing the pizza dough from the pie case;
   selecting topping ingredients in accordance with the pizza delivery order from the preparation station;
   assembling the dough and topping ingredients to form an uncooked pizza;
   while in transit, placing the pizza in the oven at a selected temperature; and
   removing the pizza from the oven after a selected cooking time.

2. The method of claim 1, wherein the preparation station includes a horizontal grid surface and the dough is stored in pizza pans, and wherein the method comprises the further steps of:
   providing a pan restraining ring having a plurality of cleats;
   after removing the pan from the pie case, placing the stored pizza pan in the restraining ring; and
   before assembling the dough and topping ingredients, placing the pizza pan, together with the restraining ring, on the horizontal grid surface.

3. The method of claim 1, wherein the selected temperature is about 450°–550° F. and the selected cooking time is between about 6 and 15 minutes.

4. The method of claim 1, further comprising the steps of:
- providing delivery boxes and a pizza cutting table in the delivery vehicle;
- placing a pizza delivery box on the pizza cutting table;
- cutting the pizza into slices; and
- placing the pizza in the pizza delivery box.

5. A method for preparing and delivering a pizza to a customer comprising the steps of:
- providing a plurality of pizza preparation and delivery vehicles, each vehicle comprising communication means for receiving pizza delivery orders, a refrigerated pie case with uncooked pizza shells stored therein, a preparation station stocked with a variety of topping ingredients; and a pizza oven;
- providing a home station equipped for receiving customer pizza delivery orders, and dispatching said customer pizza orders to said vehicles via the communication means;
- providing a commissary for periodically supplying said vehicles with a quantity of uncooked pizza shells and the variety of topping ingredients;
- receiving a customer pizza order at the home station, said order including a selection of pizza type and a delivery destination;
- dispatching the customer pizza order to one of said vehicles;
- while the vehicle is in transit removing an uncooked pizza shell from the pie case;
- while the vehicle is in transit, adding to the uncooked pizza shell toppings selected from the variety of topping ingredients in accordance with the pizza type ordered;
- while the vehicle is in transit, cooking the pizza shell and toppings in the pizza oven to thereby produce the pizza;
- driving the vehicle to the delivery destination; and
- delivering the pizza to the customer.

6. The method of claim 5 wherein each vehicle is manned with a driver and a cook.

* * * * *

UNITED STATES PATENT AND TRADEMARK OFFICE
CERTIFICATE OF CORRECTION

PATENT NO.  : 4,632,836
DATED       : Dec. 30, 1986
INVENTOR(S) : Maxwell T. Abbott et al.

It is certified that error appears in the above-identified patent and that said Letters Patent is hereby corrected as shown below:

IN THE ABSTRACT

In line 6 of the Abstract, please delete "prearation" and substitute therefor --preparation--.

IN THE BRIEF DESCRIPTION OF THE DRAWINGS

In column 4, line 8, please delete "taken along FIG. 25" and substitute therefor --of FIG. 25--.

IN THE DETAILED DESCRIPTION OF THE PRESENTLY PREFERRED EMBODIMENTS

In Subsection B. The Method, in column 11, line 36, please delete the comma (,) after the word "adapted".

Signed and Sealed this

Eleventh Day of October, 1988

*Attest:*

DONALD J. QUIGG

*Attesting Officer*     *Commissioner of Patents and Trademarks*